United States Patent

Dyche

[15] 3,699,517

[45] Oct. 17, 1972

[54] HANDWRITING AUTHENTICATION TECHNIQUE

[72] Inventor: James W. Dyche, Cupertino, Calif.

[73] Assignee: Sylvania Electric Products Inc.

[22] Filed: Sept. 24, 1970

[21] Appl. No.: 75,135

Related U.S. Application Data

[63] Continuation-in-part of Ser. No. 53,446, July 9, 1970, abandoned.

[52] U.S. Cl.....................340/146.3 Q, 340/146.3 SY
[51] Int. Cl................................................G06k 9/10
[58] Field of Search..................................340/146.3

[56] References Cited

UNITED STATES PATENTS

| | | | |
|---|---|---|---|
| 3,273,124 | 9/1966 | Greanias | 340/146.3 J |
| 3,462,548 | 8/1969 | Rinder | 340/146.3 SY |
| 3,199,078 | 8/1965 | Gaffney et al. | 340/146.3 SY |
| 2,968,789 | 1/1961 | Weiss et al. | 340/146.3 AE |
| 3,480,911 | 11/1969 | Danna | 340/146.3 SY |
| 3,487,371 | 12/1969 | Frank | 340/146.3 SY |

*Primary Examiner*—Thomas A. Robinson
*Assistant Examiner*—William W. Cochran
*Attorney*—Norman J. O'Malley, John F. Lawler and Russell A. Cannon

[57] ABSTRACT

Apparatus and method for measuring and computing velocity and acceleration of a pen point and the pen-paper contacts during writing of a signature and comparing derived data with reference data obtained from several prior signatures to determine whether the real time and reference signatures were made by the same person. The variations $x(t)$ and $y(t)$ of pen point coordinates with time and pen-paper contact intervals are obtained from a graphic tablet. Differentiator circuit means derive $x$ and $y$ velocity and acceleration components which are converted from analog to digital form for processing in a digital moment computer. Contact interval and end of signature computers receive pen point contact signals and compute the total time duration of the signature as well as the time duration of each of the first five pen-paper contact intervals normalized to the duration of the entire signature. The outputs of the moment, contact interval, and end of signature computers are sixteen components of a real time signature vector. A reference signature vector comprised of the mean values of sixteen similar components is predetermined from a plurality of prior true signatures, the deviation of each of those mean component values from the corresponding component value in a real time signature is compared with a variation limit value for that component to determine a correlation, and an authentication decision is made based on a minimum number of such correlations.

19 Claims, 9 Drawing Figures

*INVENTOR.*
JAMES W. DYCHE
BY
ATTORNEY AGENT

INVENTOR
JAMES W. DYCHE
BY
ATTORNEY AGENT

INVENTOR
JAMES W. DYCHE

BY

John F. Lawler
ATTORNEY

Russell A. Cannon
AGENT

INVENTOR.
JAMES W. DYCHE

BY

ATTORNEY AGENT

INVENTOR
JAMES W. DYCHE

BY

ATTORNEY AGENT

INVENTOR.
JAMES W. DYCHE

BY

ATTORNEY AGENT

INVENTOR.
JAMES W. DYCHE

BY

ATTORNEY AGENT

HANDWRITING AUTHENTICATION TECHNIQUE

BACKGROUND OF THE INVENTION

This is a continuation-in-part of application Ser. No. 53,446 filed July 9, 1970, now abandoned.

This invention relates to handwriting or signature authentication techniques and more particularly to improved apparatus and method for quickly and accurately identifying a person by his signature.

The handwritten signature has long been accepted legally and otherwise as a mechanism for identifying a person. The most common method of signature authentication is visual comparison of a fresh signature with a previously recorded signature and an educated guess that they were or were not made by the same person. The principal difficulty with this signature authentication method is the lack of expertise in laymen to accurately distinguish a true signature from a forgery. Coupled with this problem is the consideration that the conventionally recorded handwritten signature conveys substantially all the information needed by the forger to duplicate the signature. The two-dimensional spatial variations of the pen point trace constituting the handwritten signature also are different each time the same person writes his signature. This further complicates the recognition problem for the layman and makes difficult if not nearly impossible the application of machine or computer analysis techniques to this recognition problem.

Variables other than spatial variations of the pen trace are available for signature authentication. Such variables may be derived from pen point dynamics and include changes in pen point position with time, pen point pressure, and pen-paper contacts. Most of these signature characteristics are difficult if not impossible to duplicate merely by study of a previously recorded signature and thus offer a more secure basis for validating a signature. The application of computerized techniques in processing such signature characteristics for purposes of validation is practicable and this invention is directed to an improved system and validation method of this general type.

A general object of the invention is the provision of a system for authenticating real time signatures.

A further object is the provision of a method for handwriting authentication adapted for computerized processing of signature characteristics for authentication of a real time signature in a minimum of time and without error.

SUMMARY OF INVENTION

This apparatus and method are based on derivation of certain data from pen point or stylus dynamics, and processing these data to form a real time or test signature vector for comparison with a predetermined reference or true signature vector. The basic data are velocity and acceleration of the pen point in orthogonal directions, i.e., in $x$ and $y$ directions, the number of separate pen-paper contact intervals occurring during the writing of the signature, and the duration of those intervals. Each real time signature vector has a plurality of components based on the time duration of the signature, the time duration of each of the several pen-paper contact intervals, and moments of the velocity and acceleration components. Such components of the real time signature vector are compared with corresponding components of a reference signature and validation is based on the degree of the match of corresponding variables.

DESCRIPTION OF PREFERRED EMBODIMENTS

In accordance with this invention, an indication of whether an individual signing his signature, called a real time or test signature, is in fact the person identified by that signature is automatically produced by comparing characteristic features of a reference signature with those of the test signature. The reference signature is a vector comprising a set of components constituting unique values of characteristic features of a true signature, i.e., one known to have been signed by the individual to be identified and is referred to hereinafter as the reference vector. As described more fully hereinafter, the reference vector is obtained by the true individual signing his signature several times and preferably in cursive script, deriving from pen point dynamics in each signing certain values of the characteristic features, and determining the mean values of the latter. Thus, the reference vector reflects the inevitable variations that may be expected to occur when an individual repeatedly signs his name. A real time signature vector comprising a set of unique values of these same characteristic features is also derived from the test signing of the signature in question. The reference and real time signature vectors are compared by pattern recognition techniques to authenticate the test signature.

A signature known to have been signed by the individual who is correctly identified by that signature is referred to hereinafter as a true signature. A signature that is to be authenticated is referred to as a real time or test signature.

Figure 1:
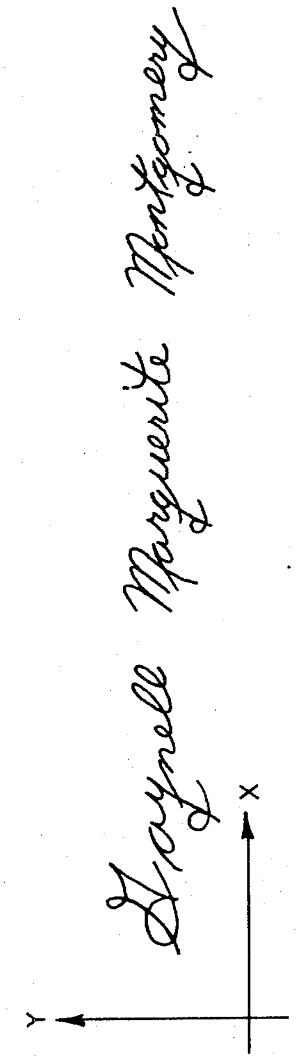
FIG. 1 is a graphic representation of a person's signature.

A typical handwritten signature is illustrated in FIG. 1. The $x$ and $y$ coordinates of the position of the point of the pen used to sign this signature continuously vary as a function of time. The velocities $\dot{x}(t)$ and $\dot{y}(t)$ and accelerations $\ddot{x}(t)$ and $\ddot{y}(t)$ of the pen point in the $x$ and $y$ directions are obtained by differentiation of pen point position with respect to time and are characteristic features from which signature definition is derived. The auto-correlation and cross-correlation of sample values of dynamic variables $\dot{x}(t)$, $\dot{y}(t)$, $\ddot{x}(t)$ and $\ddot{y}(t)$ are specific characteristic features which, in accordance with this invention, are used to define a signature. A variable which is the measure of the auto-correlation of each of these dynamic variables is also called the self-moment of the latter and is defined as the average product of the dynamic variable multiplied by itself. A variable which is the measure of the cross-correlation of these dynamic variables is similarly called the cross-moment of the latter and is defined as the average product of one dynamic variable multiplied by another different dynamic variable.

Figure 2:
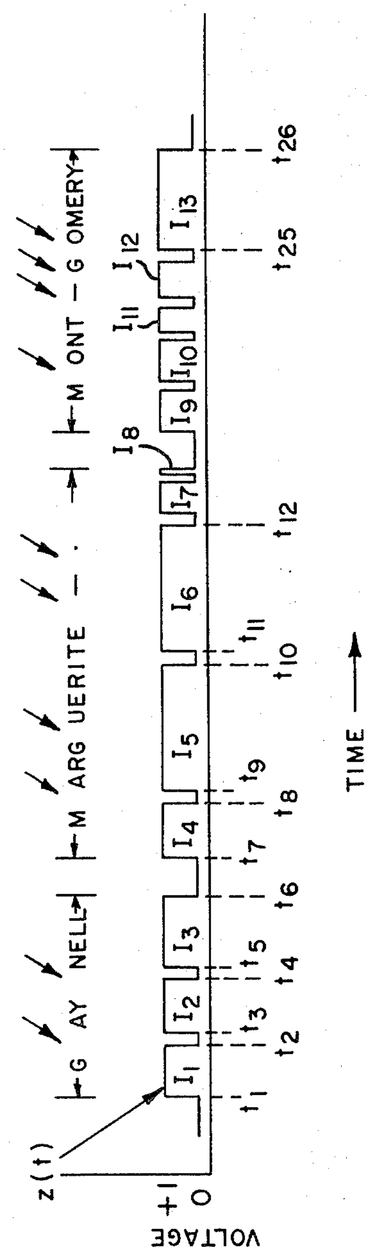
FIG. 2 is a binary waveform representing the pen-paper contact intervals occurring during signing of the signature in FIG. 1.

Reference to FIG. 1 graphically demonstrates that an individual periodically removes his pen from a paper during the signing of his signature. The number of and durations of pen-paper contact intervals occurring during the signing of a signature are also characteristic features which define a signature. The contact intervals occurring during the signing of the signature in FIG. 1 are represented, as a function of time, by the binary waveform in FIG. 2. The groups of letters printed above the waveform in FIG. 2 represent the letters formed during an associated contact interval $I_K$ while signing the signature in FIG. 1. The slanted arrows in FIG. 2 indicate where the pen point is lifted from the paper during signing of the signature. By way of example, the letters G, *ay*, and *nell* are formed during the contact intervals $I_1$, $I_2$ and $I_3$, respectively. The *t* is crossed and the *i* is dotted in the name "Marguerite" during the associated time intervals $I_7$ and $I_8$.

Terms and equations that are used in the subsequent description of a system embodying this invention are compiled and defined below for convenience:

| | |
|---|---|
| $i$ | A subscript index designating particular elements of signature and reference vectors, where $i = 1, 2 \ldots 16$. |
| $j$ | A subscript index designating a particular sample value of a dynamic variable $\dot{x}(t)$, $\ddot{x}(t)$, $\dot{y}(t)$ or $\ddot{y}(t)$, where $j = 1, 2 \ldots N$. |
| $K$ | A subscript index designating a particular pen-paper contact interval, where $k = 1, 2, \ldots 5$. |
| $q$ | A subscript index designating a particular signing of a true signature, where $q = 1, 2, \ldots Q$ and Q is a constant representing the number of signings of a true signature that are used to generate a reference vector. |
| $x(t), y(t), z(t)$ | Independent variables that specify the position of the point of a pen, as a function of time $t$, used to sign a signature. |
| $\dot{x}(t), \ddot{x}(t), \dot{y}(t), \ddot{y}(t)$ | Dependent variables representing pen point dynamics during signing of a signature. |
| $\dot{x}_j, \ddot{x}_j, \dot{y}_j, \ddot{y}_j$ | Dynamic variables representing sample values of pen point dynamics during signing of a signature. |
| T | A variable representing the time interval required to sign a signature. |
| N | A variable representing the number of samples of the dynamic variables $\dot{x}(t)$, $\ddot{x}(t)$, $\dot{y}(t)$, and $\ddot{y}(t)$ that are taken during the signing of a signature and being a measure of the time duration T thereof. |
| $I_k'$ | A variable representing the number of sample pulses produced during and being a measure of the time duration of the $k^{th}$ pen-paper contact interval of a test signature. |
| $U = [U_i]$ | A variable representing the signature vector of a test signature and comprising the elements $u_i$. |
| $u_1 = N$ | A variable that is a measure of the time duration T of the test signature. |
| $u_2$–$u_6$ | Variables that are measures of the time durations of the first five pen-paper contact intervals, normalized with respect to the time duration T of the test signature. $u_2 = I_1'/u_1$, $u_3 = I_2'/u_1$, $u_4 = I_3'/u_1$, $u_5 = I_4'/u_1$, $u_6 = I_5'/u_1$ |
| $u_7 - u_{10}$ | Variables that are measures of the auto-correlation (self-Moments) of the sampled dynamic variables $x$, $x$, $y$ and $y$ of the test signature: $u_7 = \frac{1}{u_1}\left(\sum_{j=1}^{N} \dot{x}_j \cdot \dot{x}_j\right)$ $u_8 = \frac{1}{u_1}\left(\sum_{j=1}^{N} \ddot{x}_j \cdot \ddot{x}_j\right)$ $u_9 = \frac{1}{u_1}\left(\sum_{j=1}^{N} \dot{y}_j \cdot \dot{y}_j\right)$ $u_{10} = \frac{1}{u_1}\left(\sum_{j=1}^{N} \ddot{y}_j \cdot \ddot{y}_j\right)$ |
| $u_{11} - u_{16}$ | Variables that are measures of the cross-correlations (cross-moments) of the samples dynamic variables $x$, $x$, $y$ and $y$ of the test signature: $u_{11} = \frac{1}{u_1}\left(\sum_{j=1}^{N} \dot{x}_j \cdot \ddot{x}_j\right)$ $u_{12} = \frac{1}{u_1}\left(\sum_{j=1}^{N} \dot{x}_j \cdot \dot{y}_j\right)$ $u_{13} = \frac{1}{u_1}\left(\sum_{j=1}^{N} \dot{x}_j \cdot \ddot{x}_j\right)$ $u_{14} = \frac{1}{u_1}\left(\sum_{j=1}^{N} \ddot{x}_j \cdot \dot{y}_j\right)$ $u_{15} = \frac{1}{u_1}\left(\sum_{j=1}^{N} \ddot{x}_j \cdot \ddot{y}_j\right)$ $u_{16} = \frac{1}{u_1}\left(\sum_{j=1}^{N} \dot{y}_j \cdot \ddot{y}_j\right)$ |
| M | A constant representing the reference vector of a true signature and comprising the constants L, S, $m_i$ and $v_i$. |
| L | A constant representing the total number of pen-paper contact intervals occurring during the signing of a true signature. |
| S | A constant that is 1.5N for a true signature. |
| Q | A constant representing the number of signings of a true signature that are used to generate the mean values of the associated reference vector. |
| $m_1 - m_{16}$ | Constants representing the true mean values of the associated elements $u_i$ for a true signature where $m_i = (1/Q)\sum_{q=1}^{Q} u_{iq}$ |
| $s_i = \left\{\left[1/Q\sum_{q=1}^{Q}(u_{iq})2\right] - m_i^2\right\}^{1/2}$ | A constant representing the variance between the elements $u_i$ used to generate the reference vector M and the associated mean values $m_i$ thereof, and being a measure of the standard deviation or variance of an element $u_i$ from the mean value $m_i$ thereof. |
| $v_i = 4s_i$ | Constant representing the variance which $\mid u_i - m_i \mid$ may not exceed for a $u_i$ of a test |

signature to be considered as having been obtained from a true signature.

Figure 3:
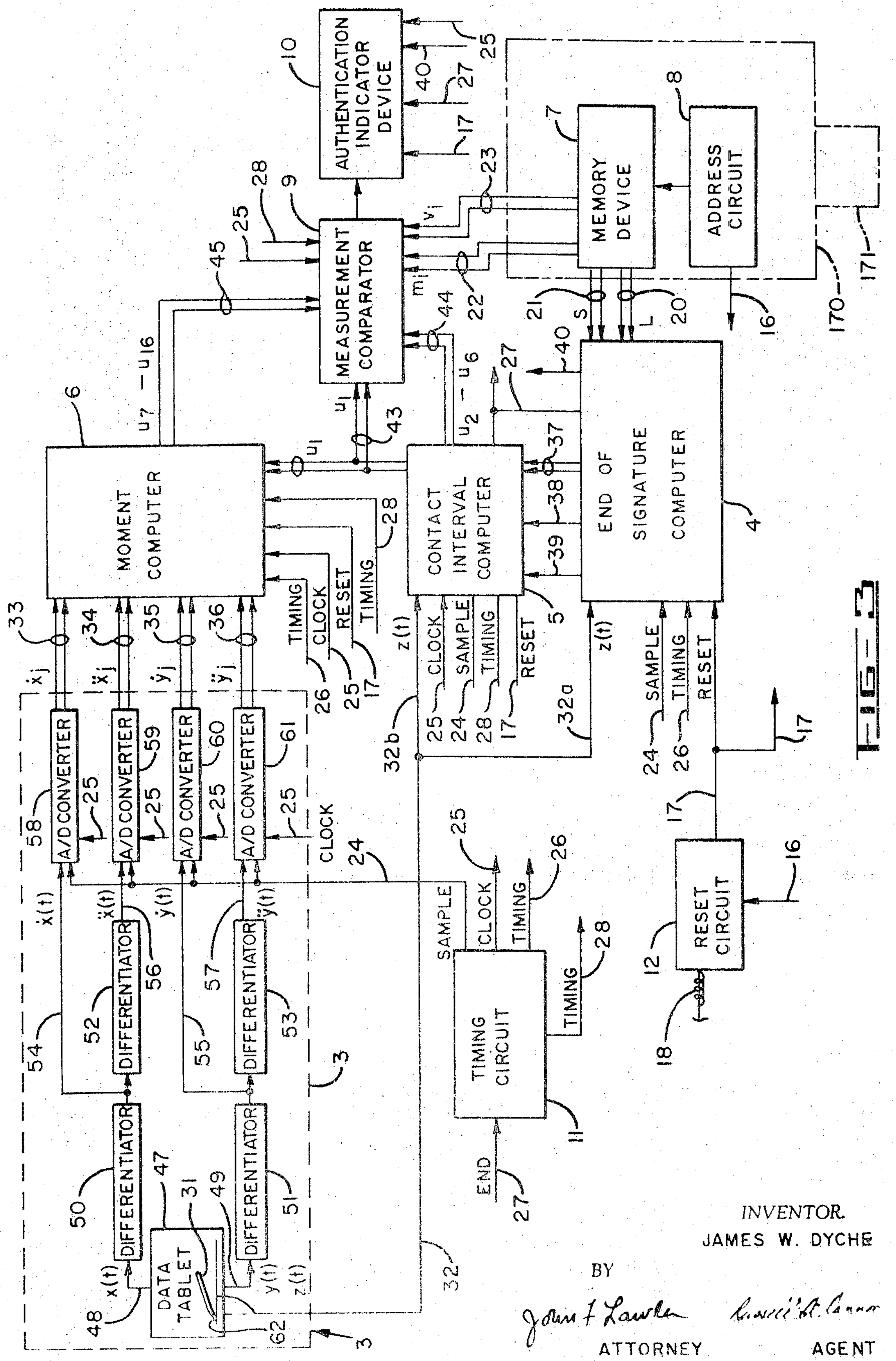
FIG. 3 is a block diagram of a system embodying this invention.

Referring now to FIG. 3, a signature authentication system embodying this invention comprises measurement circuit 3; computer circuits 4, 5 and 6; memory device 7 having an associated address circuit 8; measurement comparator 9; authentication indicator device 10, timing circuit 11; and reset circuit 12. Memory device 7 stores reference vectors associated with or derived from a plurality of true signatures. The reference vector for a particular true signature is retrieved from memory device 7, which may also store identifying data for a plurality of different true signatures, by conditioning address circuit 8 to select from the memory device the data representing reference vector components of the particular signature to be validated. This conditioning mechanism, for example, may consist of a code number for that signature which is fed into circuit 8. This operation causes the address circuit to produce a pulse on line 16 which causes circuit 12 to generate a pulse on line 17 for resetting computers 4–6, comparator 9, and indicator 10. Alternatively, reset circuit 12 may be manually enabled through switch 18. New values of constants L and S for the particular true signature are coupled from memory device 7 and are applied on lines 20 and 21, respectively, to computer 4. New values of constants $m_i$ and $v_i$ are applied on lines 22 and 23, respectively, to comparator 9.

Timing circuit 11 produces low frequency sample pulses on line 24, high frequency clock pulses on line 25, and low frequency timing pulses on line 26. Circuit 11 is also responsive to a control pulse on line 27 for producing timing pulses on line 28. Although the pulses on lines 24 and 26 may have the same pulse repetition frequency, pulses on line 26 are delayed with respect to pulses on line 24. The low frequency timing pulses control initiation of certain operations as described more fully hereinafter. The high frequency clock pulses control the operation of digital circuitry. Although the timing pulses are shown as being produced on single lines 26 and 28 for simplicity of illustration and description, there are actually a plurality of appropriately delayed timing pulses applied on lines 26 and 28 to control the sequential operation of digital circuits as is well known in the computer art. By way of example, pulses on lines 24 and 26 may have clock frequencies of 30 Hz.

Circuitry for producing the signature vector U includes the measurement circuit 3 and computer circuits 4–6. Circuit 3 is responsive to the position and movement of the point of a writing instrument or stylus 31 used for signing a test signature. The output is a binary signal $z(t)$ on line 32 indicating whether the point of the instrument is in contact with a writing surface. The measurement circuit is also responsive to sample pulses on line 24 for periodically producing binary output signals on lines 33–36 that correspond to the orthogonal sampled velocities and accelerations, i.e., velocities and accelerations in the $x$ and $y$ directions.

Computer 4 is responsive to the binary signal $z(t)$ on line 32a, sample and timing pulses, and the signals L and S stored in memory device 7 for producing on lines 37, 38 and 39 indications of the occurrence of each contact interval. In addition, computer 4 produces on line 27 an indication of the occurrence of the end of a test signature, and, on line 40, a signal indicating that the test signature is incomplete if this condition should occur as explained hereinafter. Computer 5 is responsive to the binary signal $z(t)$ on line 32*b*; clock, sample and timing pulses; and the operation of the end of signature computer 4 for producing on lines 43 and 44 indications of the element $u_1$ representing the time duration of the test signature and elements $u_2$–$u_6$ representing certain pen-paper contact intervals, respectively. Computer 6 is responsive to clock and timing pulses and the operation of contact interval computer 5 for operating on the signals on lines 33–36 to produce on lines 45 indications of the moments of the sampled dynamic variables $\dot{x}_j$, $\ddot{x}_j$, $\dot{y}_j$ and $\ddot{y}_j$. These moments constitute self-moments or auto-correlations of these dynamic variables and cross-moments or cross-correlations thereof and are the elements $u_7 - u_{16}$, inclusive. Circuit 9 is operative for comparing values of the signature vector on lines 43, 44 and 45 with corresponding values of the reference vector on lines 22 and 23 for enabling device 10 to indicate whether the test signature is also a true signature.

Measurement circuit 3 comprises a data tablet 47, differentiator circuits 50–53, and analog-to-digital converters 58–61. The test signature is signed with the pen 31 along the line 62 on the writing surface of the data tablet which may be covered with paper. Electrical circuitry in the data tablet senses whether the pen is in contact with the writing surface and provides a binary indication thereof on line 32. Alternatively, a pushbutton switch which is electrically connected to line 32 may be located in the point of the pen for detecting when the pen point and the writing surface are in contact. By way of example, the signal on line 32 may be a binary 1 during a pen-paper contact interval. Electrical circuitry in the data tablet also senses the position of the pen point thereon and produces on lines 48 and 49 analog signals that are proportional to the instantaneous orthogonal positions $x(t)$ and $y(t)$ of the pen point. Data tablet 47 may, by way of example, be of the type described in the 1968 AFIPS Conference Proceedings, vol. 32, pages 315–321 (Thompson Book Company, Washington D.C.).

Circuits 50 and 51 differentiate the analog signals on lines 48 and 49 and produce on lines 54 and 55 analog signals that are proportional to the orthogonal velocities $\dot{x}(t)$ and $\dot{y}(t)$, respectively, of the pen point. The circuits 52 and 53 differentiate the output signals of the first differentiators and similarly produce on lines 56 and 57 analog signals that are proportional to the orthogonal accelerations $\ddot{x}(t)$ and $\ddot{y}(t)$, respectively, of the pen point. Converters 58–61 are responsive to the sample and clock pulses on lines 24 and 25 for sampling the analog signals on associated lines 54–57 and converting these analog signals into associated binary signals on lines 33–36, respectively.

Figure 4:
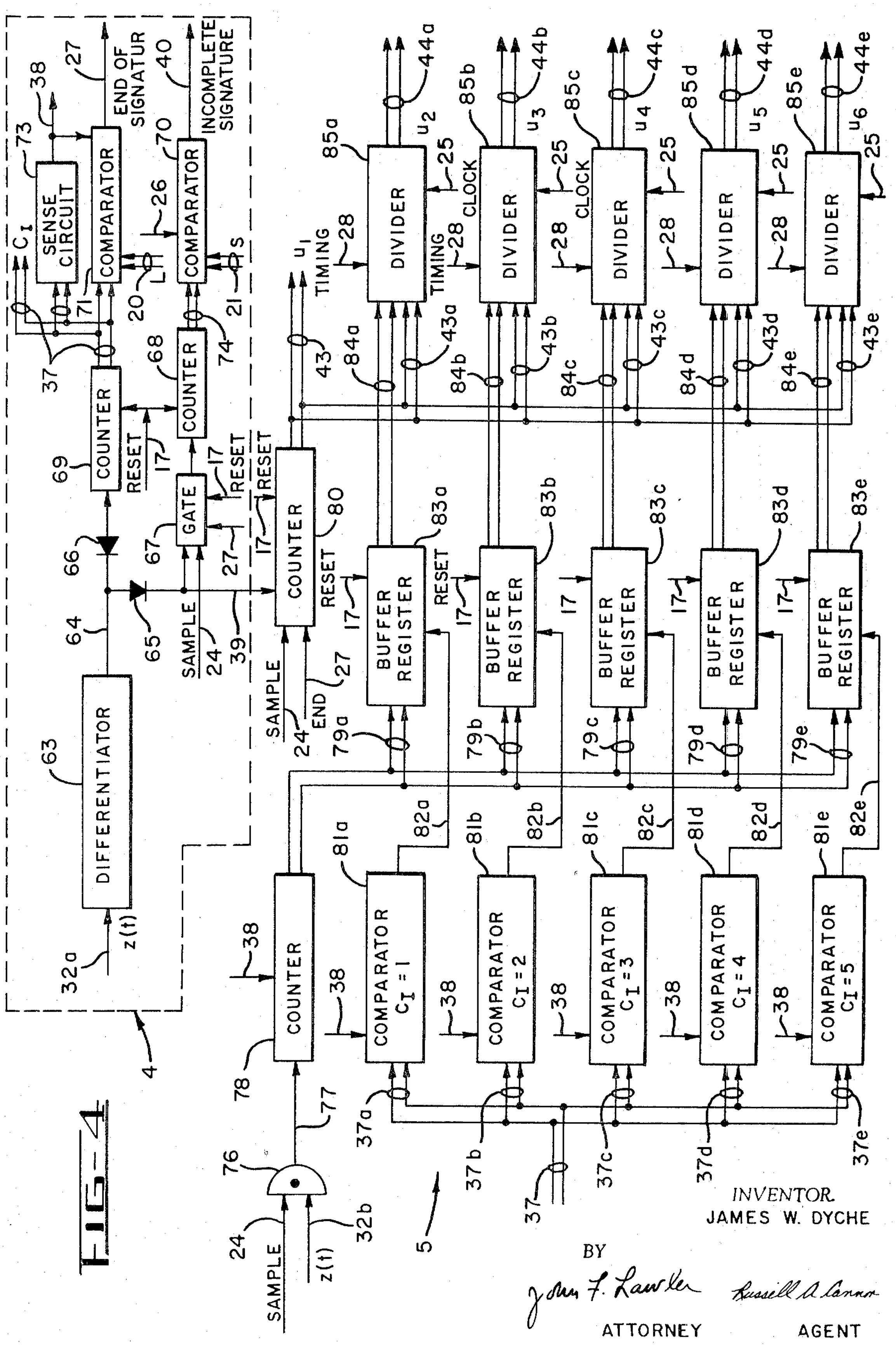
FIG. 4 is a block diagram of the contact interval and end of signature computers in FIG. 3.

Referring now to FIG. 4, end of signature computer 4 comprises a differentiator 63, steering diodes 65 and 66, gate circuit 67, binary counters 68 and 69, and binary comparators 70 and 71. The binary signal $z(t)$ on line 32*a* is essentially a square wave having an amplitude of +1 volt, for example, when the pen point is in contact with the writing surface and having a value of 0 when the pen point is spaced from the tablet. Circuit 63 differentiates the signal $z(t)$ and produces on line 64 a positive going pulse that is passed by diode 65 when the pen point contacts the writing surface and a negative going pulse that is passed by diode 66 when the pen point is removed therefrom. Binary counter 69 is responsive to each pulse passed by diode 66 for incrementing or adding it to the contents thereof. Thus, the contents of counter 69 represent the current number $C_I$ of pen-paper contact intervals that have occurred during the signing of a test signature. The binary output of counter 69 is applied on lines 37 to comparator 71 and sense circuit 73, the latter detecting a change in the contents of this counter. The binary signal L, which is a binary number corresponding to the correct number of contact intervals occurring in the associated true signature, is also applied to comparator 71 from memory device 7 on lines 20. Binary comparator 71 is responsive to each output pulse of circuit 73 comparing the binary numbers on lines 20 and 37 to produce an end of signature control pulse on line 27 when these numbers are equal.

Gate circuit 67 is a latching circuit which is enabled and latched by the first positive pulse passed on line 39 by diode 65. Circuit 67 is held in this enabled state for passing sample pulses on line 24 until it is disabled by the end of signature pulse on line 27 or reset by a control pulse on line 17. The contents of binary counter 68 are advanced by each sample pulse passed by gate 67 for producing on lines 74 a binary number signal that is proportional to the time duration of the test signature. Binary signal S is applied to comparator 70 on lines 21. Comparator 70 is enabled by timing pulses on line 26 for comparing the binary numbers on lines 21 and 74 to produce on lines 40 an indication of whether the test signature was completed within the time interval specified by the binary number S.

Contact interval computer 5 is also illustrated in FIG. 4 and comprises gate circuit 76, binary counters 78 and 80, binary comparators 81*a*–81*e*, buffer registers 83*a*–83, and binary divider circuits 85*a*–85*e*. Counter 80 is enabled by the first positive pulse passed by diode 65 for advancing the contents thereof each time a sample pulse is received on line 24. This counter is responsive to the end of signature pulse on line 27 for holding the contents thereof until it is reset by a pulse on line 17. The binary output $u_1$ of counter 80 on lines 43 is a measure of the time duration or length of the test signature. In a modified form of this invention, circuits 67 and 68 may be omitted and the output of counter 80 connected to lines 74 for producing the incomplete signature indication.

Gate 76 is an AND gate that is enabled by the binary signal $z(t)$ on line 32*b* for passing sample pulses on line 24 only during a contact interval. Circuit 78 is a binary counter which advances the contents thereof each time a clock pulse is passed by gate 76. Counter 78 is responsive to the output of sense circuit 73 on line 38 for resetting this counter after a preset delay. The contents of counter 78 on lines 79 are therefore equal to the number of sample pulses occurring during and is a measure of the time duration of a current contact interval.

Binary comparators 81*a*–81*e* are each responsive to the output of counter 69 on lines 37. Each comparator 81 is preset with a different binary number designating an associated contact interval. By way of example, the comparators 81*a*–81*e* may be preset with the binary numbers 001, 010, 011, 100, 101, respectively, which designate the first five contact intervals in a test signature. Each comparator 81 is responsive to a control pulse on line 38 indicating a change in the contents of counter 69 for comparing the input binary number on lines 37 with the associated preset binary number. The output signals of the comparators 81 are control pulses that are applied on lines 82*a*–82*e* to associated buffer registers 83*a*–83*e*, respectively. At the termination of each of the first five contact intervals, only one comparator 81 produces a control pulse on line 82 for indicating the end of an associated contact interval and enabling only the associated buffer register to read the contents of counter 78. Registers 83 are reset by pulses on lines 17.

The output of counter 80 on lines 43 and the buffer registers on lines 84 are applied to associated binary divider circuits 85*a*–85*e*. Each divider circuit 85 is responsive to a timing pulse on line 28 subsequent to the end of signature pulse for receiving clock pulses on line 25, for reading the signals on associated lines 43 and 84, and for dividing the output of an associated buffer register by the contents of counter 80. Thus, the outputs $u_2 - u_6$ of divider circuits 85a to 85e, respectively, are measures of the time durations of associated contact intervals normalized with respect to the length (or time duration) of the test signature. Although any number of sets of comparators 81, buffer registers 83 and divider circuits 85 may be employed for producing indications of the time durations of a different number of contact intervals, it has been determined empirically that a satisfactory amount of data uniquely defining a signature may be obtained from the first five contact intervals.

Figure 5:
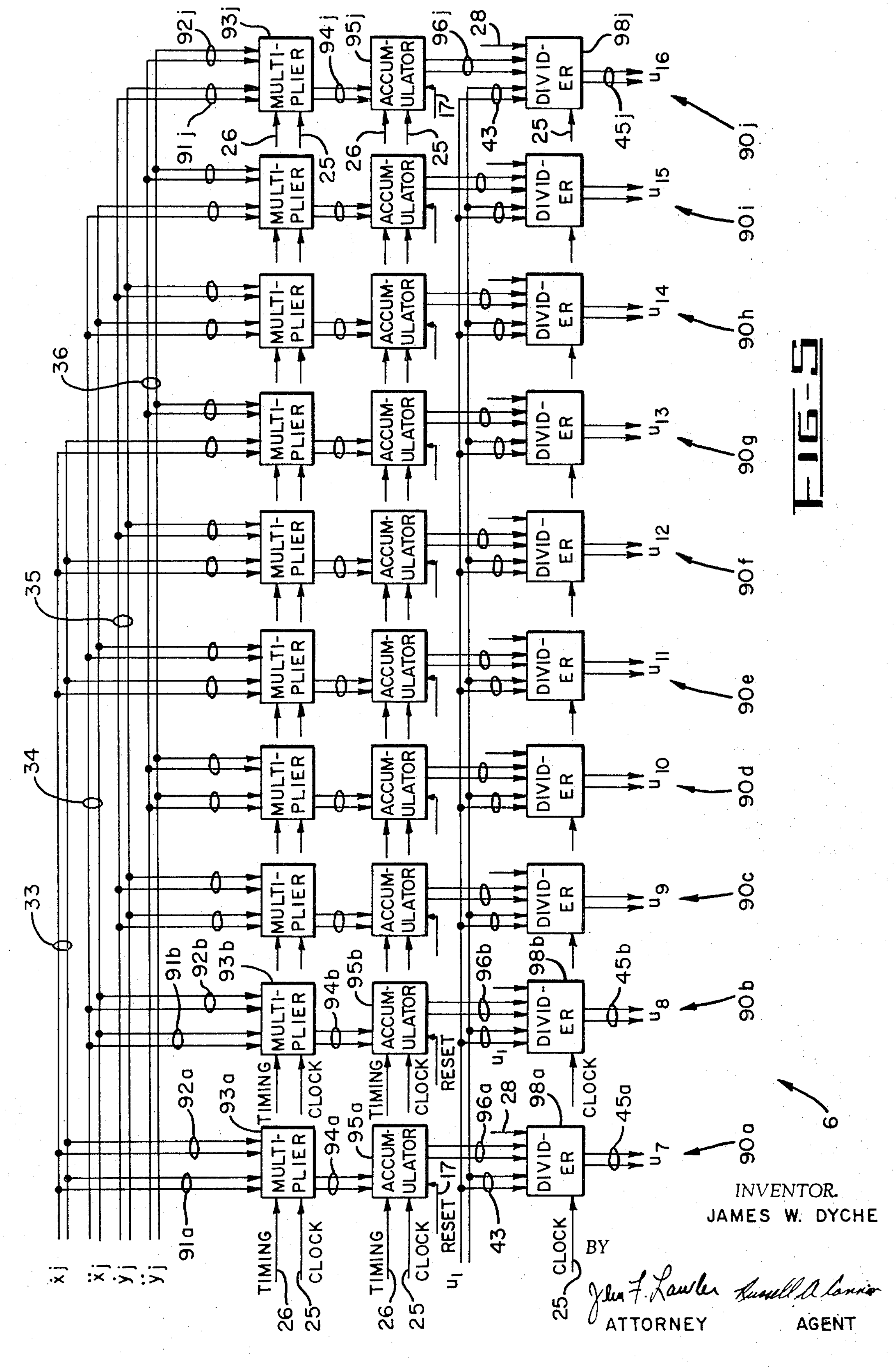
FIG. 5 is a block diagram of the moment computer in FIG. 3.

Moment computer 6 is illustrated in FIG. 5 and comprises ten computation circuits 90*a*–90*j*, each comprising the series combination of an associated binary multiplier 93*a*–93*j*, binary accumulators 95*a*–95*j* and binary divider circuits 98*a*–98*j*. *Each computation circuit 90 is designed to produce a different moment of the signals on lines 33–36* (see FIG. 3). In one embodiment of the invention, variables representing both self-moments and cross-moments of the sampled dynamic variables $\dot{x}_j$, $\ddot{x}_j$, $\dot{y}_j$ and $\ddot{y}_j$ are produced to provide ten separate components of the signature vector. In such an embodiment, circuits 90a to 90d produce the autocorrelation functions or second order self-moment $u_7 - u_{10}$ of the samples variables $\dot{x}_j$, $\ddot{x}_j$, $\dot{y}_j$ and $\ddot{y}_j$, respectively. Circuits 90e-90j produce the cross-moments $u_{11} - u_{16}$ of these variables. Since all of the computation circuits 90 are similar except for the input signals applied on lines 91 and 92 to the multipliers 93, only the structure and operation of the computation circuit 90a will be described in detail.

If it is desired to simplify the system without proportional loss of signature discrimination, the number of signature vector components may be reduced from the ten shown in the drawings to six preferably by omission of circuits 90*a*–90*d*, thus relying on the six cross-moment circuits 90*e*–90*j* to produce the vector components $u_{11} - u_{16}$ in addition to those previously identified as $u_1 - u_6$.

Lines 91*a* and 92*a* are connected to lines 33 for coupling the samples velocity variable $\dot{x}_j$ to both inputs of multiplier 93*a*. Accumulator circuit 95*a* adds the input signal on lines 94*a* to the contents thereof. Clock pulses are applied on lines 25 to multiplier 93*a*, accumulator 95*a* and divider circuit 98*a*. Timing pulses are also applied on lines 26 to multiplier 93*a* and accumulator 95*a*. The signature length signal $u_1$ is applied on lines 43 to divider circuit 98*a*. A timing pulse is also applied on line 28 to divider 98*a*. A reset pulse is applied on line 17 to accumulator 95a.

In operation, the accumulator is reset by the control pulse on line 17. Multiplier 93a is responsive to a timing pulse on line 26 for receiving the clock pulses and multiplying the sampled binary signal $\dot{x}_j$ on lines 33 by itself and producing on lines 94a a binary number equal to the resulting product. When the multiplication operation is complete, a timing pulse on a line 26 enables circuit 95a to receive the clock pulses, to receive the product signal from multiplier 93a, and to add this product signal to the contents thereof. Circuit 98a is responsive to the timing pulse on line 28 for receiving the clock pulses and dividing the accumulated sum signal on lines 96a by the final value of the variable $u_1$ on lines 43. The output of the divider 98a on lines 45a is a binary number representing the value of the variable $u_7$. This operation for the other nine combinations of velocity and acceleration components yields corresponding binary numbers represented as $u_8 - u_{16}$, inclusive.

In order to verify that a person is actually the individual he represents himself to be by having him sign his test signature, extracting the signature vector from it, and comparing this vector with an associated reference vector, it is first necessary to produce the reference vector from true signatures signed by the proper individual. The reference vector comprises mean values $m_i$ for each characteristic feature $u_i$ of the signature vector; and values of the constants L, S and $v_i$. The mean values $m_i$ are representable as $$m_i = \frac{1}{Q} \sum_{q=1}^{Q} u_{iq} \tag{1}$$

where the index subscript $i = 1, 2, \ldots 16$ designates individual characteristic features, the index subscript $q = 1, 2, \ldots Q$ designates particular signings of the true signature, and $Q$ represents the number of true signatures used to determine the mean values. The constant $L$ is equal to the number of contact intervals in a true signature. The constant $S$ is 1.5 times the number N of sample pulses produced during a true signature, where $N$ is the average of such clock pulses for $Q$ test signatures. A standard deviation $s_i$ between a mean value $m_i$ and the individual values $u_i$ used to compute this mean value is representable as $$s_i = \left[ \left\{ \frac{1}{Q} \sum_{q=1}^{Q} (u_{iq})^2 \right\} - m_i^2 \right]^{1/2}. \tag{2}$$

A more general representation of the standard deviation $s_i$ is $$s_i = \left[ \frac{1}{Q-1} \left\{ \sum_{q=1}^{Q} \left( u_{iq} - \frac{1}{Q} \sum_{q=1}^{Q} u_{iq} \right)^2 \right\} \right]^{1/2} \tag{3}$$

$$= \left[ \frac{1}{Q-1} \left( \sum_{q=1}^{Q} u_{iq}^2 \right) - \frac{1}{Q(Q-1)} \left( \sum_{q=1}^{Q} u_{iq} \right)^2 \right]^{1/2}. \tag{4}$$

The absolute value of the difference between the measured value of a characteristic $u_i$ for a test signature and its associated mean value $m_i$ (i.e., $u_i - m_i$) may vary within a limited range and still be considered to have been extracted from a true signature. Such a range is a function of the variable $s_i$ and may, by way of example, have limits of $v_i = 4s_i$, where $v_i$ is the variation limit.

Figure 6:
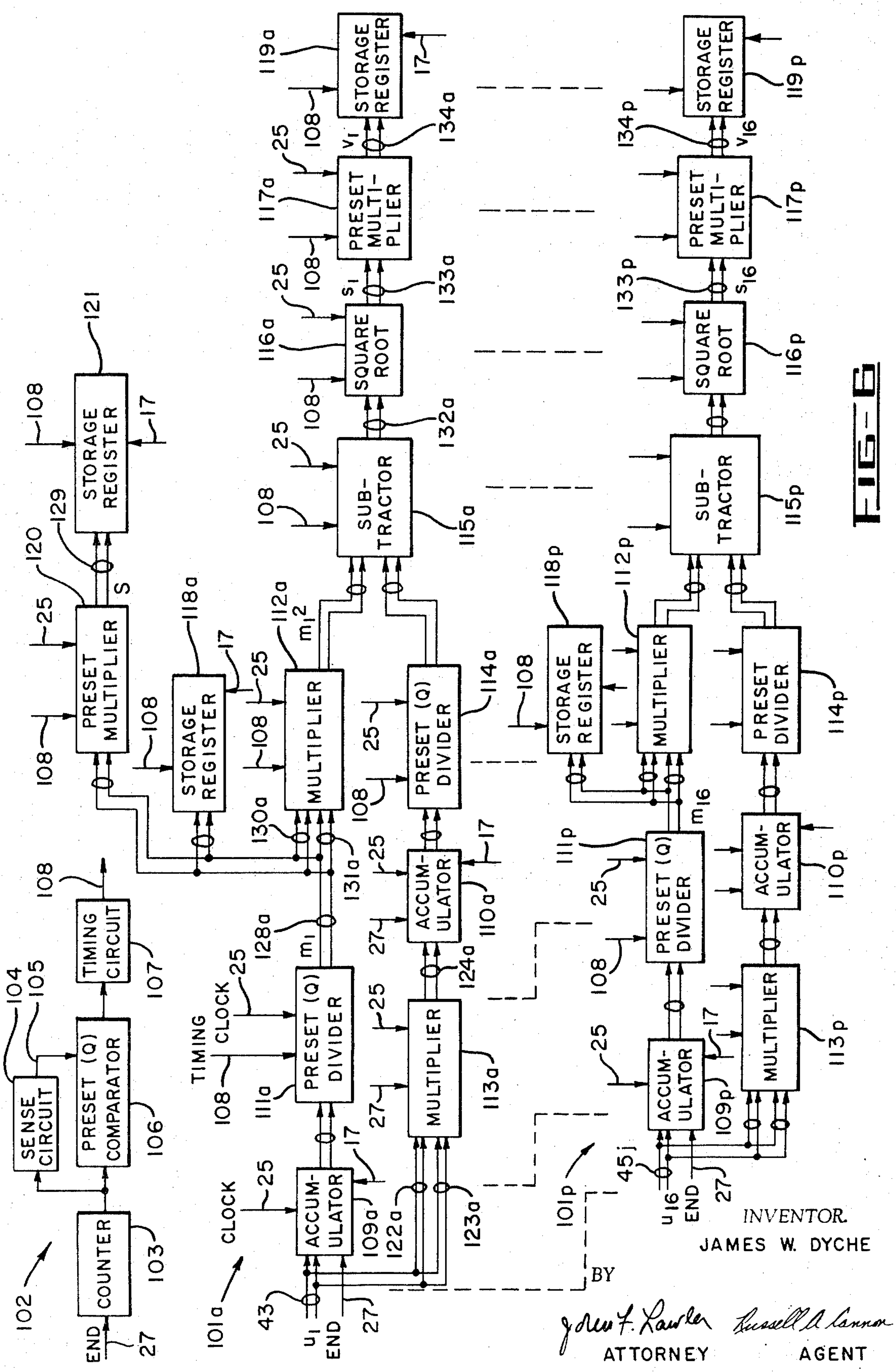
FIG. 6 is a block diagram of computation circuitry for producing the reference signature vector.

Individual values of the characteristic features $u_i$ for producing the reference vector mean values $m_i$ and variation limit $v_i$ may be produced with circuitry similar to that shown in FIGS. 3–5 except that the incomplete signature channel comprising gate 67, counter 68, and comparator 70 in FIG. 4 is not required. Also, the constant L is obtained by signing a true signature and reading the binary number on lines 37 after this signing is complete. This binary number is then entered in a storage register connected to lines 20. The contents of this register is not updated during subsequent signings of true signatures. In order to compute values of the constants $m_i$, $v_i$ and $S$, the end of signature control pulse on line 27 and signals on lines 43, 44 and 45 that represent the characteristic features $u_i$ of the true signature are applied to associated computation circuits 101a–101p in FIG. 6 wherein $v_i$ is a function of equation (2). The end of signature control pulse on line 27 is also applied to a single control circuit 102 which determines when the prescribed number $Q$ of signings of a true signature for deriving a reference vector are complete. Since all of the circuits 101 are similar, only the structure and operation of circuit 101a will be described in detail.

Referring now to FIG. 5, control circuit 102 comprises binary counter 103, sense circuit 104, preset comparator 106 and timing circuit 107. Computation circuit 101a comprises binary accumulators 109a and 110a; binary divider circuits 111a and 114a; binary multiplier circuits 112a, 113a and 117a; binary subtractor circuit 115a; a binary circuit 116a for producing an output that is proportional to the square root of a binary signal applied thereto; and, storage registers 118a and 119a. Only the computation circuit 101a also includes a binary multiplier 120 and storage register 121. Accumulators 109a and 110a and registers 118a, 119a and 120 are initially reset by control pulses on lines 17. Clock pulses are applied on lines 25 to circuits 109a–117a, inclusive, and circuit 120. Circuits 111a, 112a, 114a–119a, 120 and 121 are also responsive to timing pulses on lines 108 from circuit 107. The end of signature pulse is applied on lines 27 to accumulators 109a and 110a and to multiplier 113a. Comparator 106 is preset with a binary number Q corresponding to the number of signings of a true signature that are to be used to produce a reference vector. Divider circuits 111a and 114a are also preset with the binary number $Q$. Multiplier circuits 117a and 120 are preset with binary numbers corresponding to constants such as 4 and 1.5, respectively.

Accumulator 109a is enabled by each end of signature control pulse on line 27 (see FIG. 4) for receiving the clock pulses and adding the binary number $u_1$ on lines 43 to the contents thereof. Circuit 113a is also enabled by each end of signature pulse on line 27 for receiving clock pulses and multiplying the binary numbers on lines 122a and 123a together to square each binary number $u_1$. Accumulator 110a is responsive to each pulse on line 27 for adding the product signal on lines 124a to the contents thereof.

Binary counter 103 is also responsive to signals on line 27 for counting the end of signature control pulses. Sense circuit 104 detects changes in the contents of counter 103 for producing a control pulse on line 105 that enables circuit 106 to compare the binary number in the counter 103 with the preset number Q. When these numbers are equal, comparator 106 produces a control pulse that enables circuit 107 for producing timing pulses on line 108. Although the timing pulses are shown as being produced on a single line 108 for simplicity of illustration and description, there are actually a plurality of appropriately delayed timing pulses applied on associated lines 108 to control the sequential operation of digital circuits in FIG. 6 as is well known in the computer art.

Circuit 111*a* is enabled by a timing pulse on a line 108 for receiving clock pulses and dividing the contents of accumulator 109*a* by the preset binary number Q. Register 118*a* is enabled by a timing pulse on line 108 to store the signal on lines 128*a* which is the mean value $m_1$. Circuits 120 and 121 are responsive to timing pulses on lines 108 for multiplying the constant $m_1$ on lines 128*a* by the preset number and for storing the product signal S on lines 129. Circuit 112*a* is enabled by the timing pulse on a line 108 to receive clock pulses and to multiply the binary signals on lines 130*a* and 131*a* together to square the mean value $m_1$. Divider 114*a* is responsive to a control pulse on a line 108 for receiving clock pulses and dividing the accumulated signal in circuit 110*a* by the preset binary number $Q$.

Subtraction circuit 115*a* is enabled by a timing pulse on a line 108 to receive the clock pulses and the output signals of multipliers 112*a* and divider 114*a* for producing on lines 132*a* a signal that is proportional to the absolute value of the difference therebetween. This signal on lines 132*a* is proportional to the square of the standard deviation $s_1$ in equation (2) which represents the variation between individual values of the variable $u_1$ used to generate the reference vector and the associated mean value $m_1$ thereof. Circuit 116*a* is enabled by the timing pulse on a line 108 to receive the clock pulses and the binary signal on line 132*a* for taking the square root of the latter signal and producing on lines 133*a* a signal that is proportional to the standard deviation $s_1$ [see equation (2)]. Multiplier 117*a* and register 119*a* are also enabled by subsequent timing pulses on lines 108 for circuit 117*a* to receive the clock pulses and multiply the binary signal $s_1$ on lines 133a by the preset binary number to produce the variation band value $v_1$ on lines 134*a* which is stored by register 119*a*.

The resultant signature vector M comprises the constants $m_i$, $v_i$ and $S$ which are stored in registers 118*a*, 119*a* and 121, respectively. In the authentication system in FIG. 3, these constants $m_i$, $v_i$ and $S$, together with the contact interval constant L, are entered into and stored by memory device 7.

Figure 7:
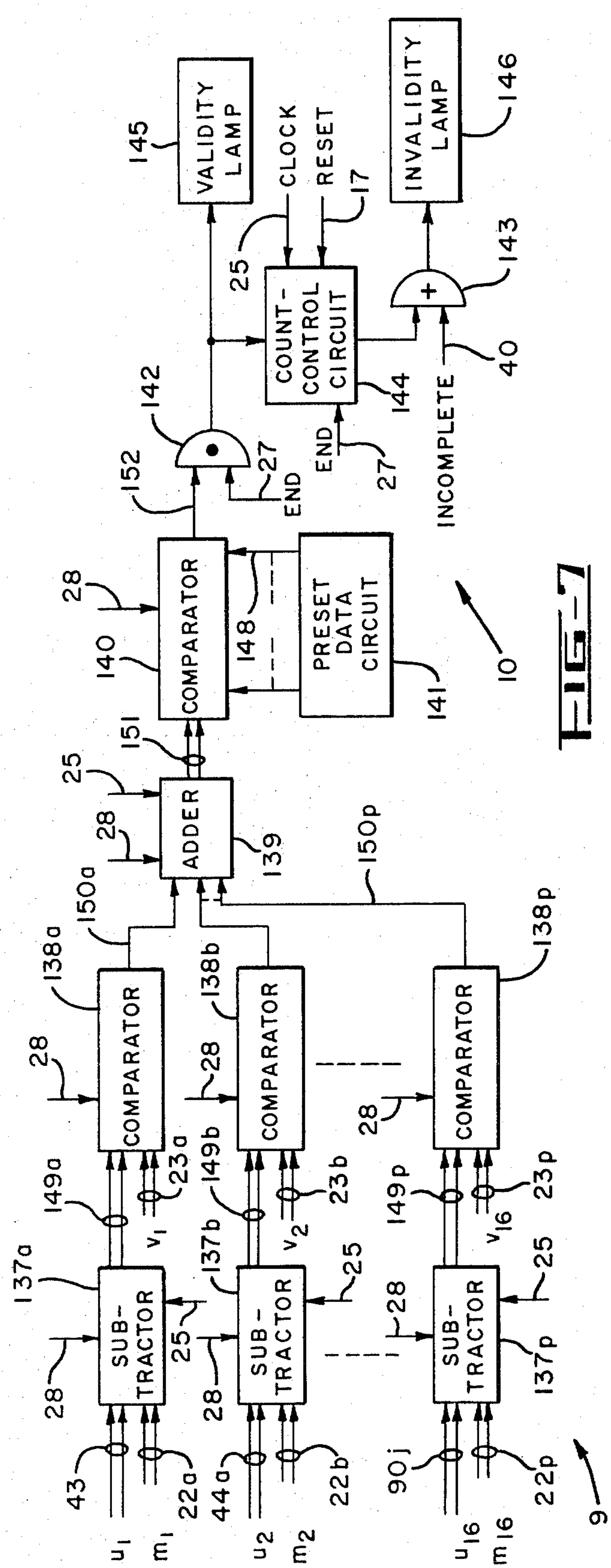
FIG. 7 is a block diagram of the measurement comparator and the authentication indicator device in FIG. 3.

Referring now to FIG. 7, measurement comparator circuit 9 comprises a plurality, sixteen as shown, of binary subtractor circuits 137*a*–137*p* and the same number of binary comparator circuits 138*a*–138*p*, associated circuits 137 and 138 being connected in series to an input of binary adder 139; a binary comparator 140; and a preset data circuit 141. Indicator device 10, see FIG. 3, comprises gate circuits 142 and 143, count-control circuit 144, and lamps 145 and 146. Since circuits 137*a*–137*p* and 138*a*–138*p* are similar, only the structure and operation of circuits 137*a* and 138*a* will be described in detail. Clock pulses are applied to circuits 137, 139 and 144 on associated lines 25. Timing pulses are applied on lines 28 to circuits 137–140.

The current value of the variable $u_1$ and the reference value $m_1$ thereof are applied on lines 43 and 22*a*, respectively, to subtractor circuit 137*a*. Variation limit $v_1$ of the reference vector is applied on lines 23*a* to comparator 138*a*. Circuit 141 stores a preset binary number which is applied on lines 148 to comparator 140 and is a measure of the number of variables $u_i$ that must meet the authentication criteria (i.e., $|m_i - u_i| \leq v_i$) in order to authenticate the test signature as a true signature. In short, the preset binary number in circuit 141 is a threshold.

Gate 142 is an AND gate which is enabled by an end of signature pulse on line 27. Gate 143 is an OR gate that is opened by a pulse on line 40 (see FIG. 4) to illuminate invalidity lamp 146. Count-control circuit 144 comprises a counter and a comparator (not shown). Circuit 144 is also enabled by the end of signature pulse on line 27 for receiving and counting clock pulses on line 25. This circuit 144 is disabled and reset when gate 142 opens. If circuit 144 is neither disabled nor reset before the count therein exceeds a prescribed number, the output thereof increases to open gate 143 and illuminate lamp 146.

Subtractor circuit 137a is enabled by a timing pulse on a line 28 for receiving clock pulses and producing on lines 149a a binary signal proportional to the absolute value of the difference between the input signals thereto. This can be accomplished by dropping the sign bit of the resultant in circuit 137*a*. Binary comparator circuit 138*a* is enabled by a subsequent timing pulse on a line 28 for producing a binary output on line 150a that indicates the relative amplitude of the difference signal on lines 149*a* with respect to the variation value $v_1$ on lines 23*a*. By way of example, the signal on line 150*a* may be a binary 1 if the difference signal is equal to or less than the value $v_1$. Adder 139 is enabled by a timing pulse on line 28 for receiving clock pulses and summing the binary signals on lines 150*a*–150*p*. The binary sum signal on lines 151 is a measure of the number of variables $u_i$ that do match, within a predetermined variation band, the respective mean values $m_i$ thereof. As stated previously, the preset binary number in circuit 141 is a measure of the number of variables $u_i$ that must match the associated mean values $m_i$ thereof for a test signature to be authenticated as being a true signature; thus circuit 141 provides an adjustable threshold signal on which authentication is conditioned. Circuit 140 is enabled by a timing pulse on line 28 for comparing the binary numbers on lines 148 and 151. The output of comparator 140 on line 152 is a binary 1, for example, if the binary sum signal on line 151 is equal to or exceeds the preset binary number on lines 148. If the signal on line 151 is a binary 1 during receipt of an end of signature pulse on line 27, gate 142 closes to cause energization of validity lamp 145, thus that the real time signature is valid. On the other hand, if the output of comparator 140 is a zero when the signal on line 151 is less than the threshold level, gate 142 does not close and no validation of the real time signature is indicated by lamp 145.

Figure 8:
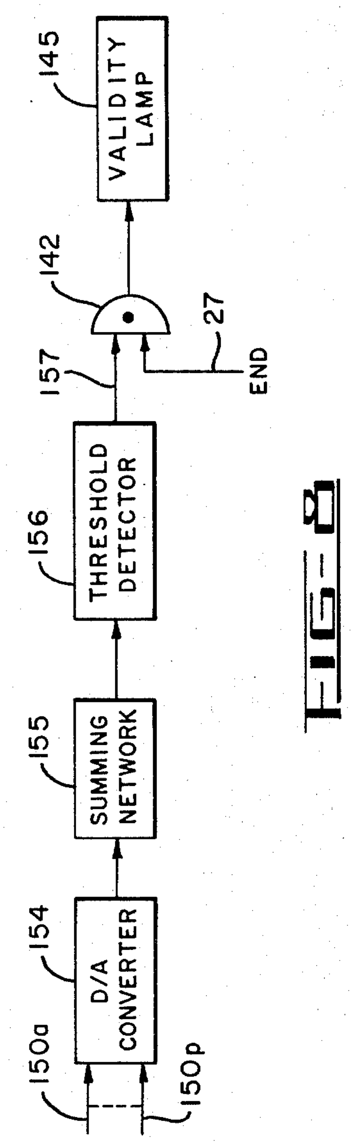
FIG. 8 is a block diagram of an alternate embodiment of the measurement comparator in FIG. 7.

An alternate embodiment of the measurement comparator 9 is illustrated in FIG. 8 wherein binary adder 139, binary comparator 140 and preset data circuit 141 are replaced by a digital to analog (D/A) converter 154, summing network 155, and threshold detector circuit 156. The signals on the sixteen lines 150*a*–150*p*, each of which represents a binary 1 or 0, are converted to associated analog signals that are summed by network 154. The sum signal is compared with a preset analog threshold voltage in detector 156 which produces a binary signal on line 157 that controls the operation of AND gate 142 when the latter is enabled by an end of signature pulse on line 27. The threshold level of the detector 156 is adjustable and is a measure of the number of real time and reference values of characteristic features $u_i$ that must match in order that the test signature be authenticated.

The functions of the authentication system described above may be performed, if desired, by a special purpose digital computer. Each of the computation circuits such as divider circuits 85, 98, 111 and 114; multiplier circuits 93, 112, 113, 117 and 120; accumulator circuits 95, 109, and 110; subtractor circuits 115 and 137; circuit 116; and the comparators, is a logic circuit. The design of such logic circuits is well known and generally is described in texts such as "Logic Design of Digital Computers" by M. Phister, Jr., (John Wiley & Sons). Although not fully described here in detail, it is to be understood that timing pulses and delays are employed throughout these circuits, as is common practice in the design of digital circuitry, to prevent race conditions and to insure proper operation. In practice, each of these logic circuits in one embodiment of the invention comprises a miniature computer constructed with integrated circuits.

Figure 9:
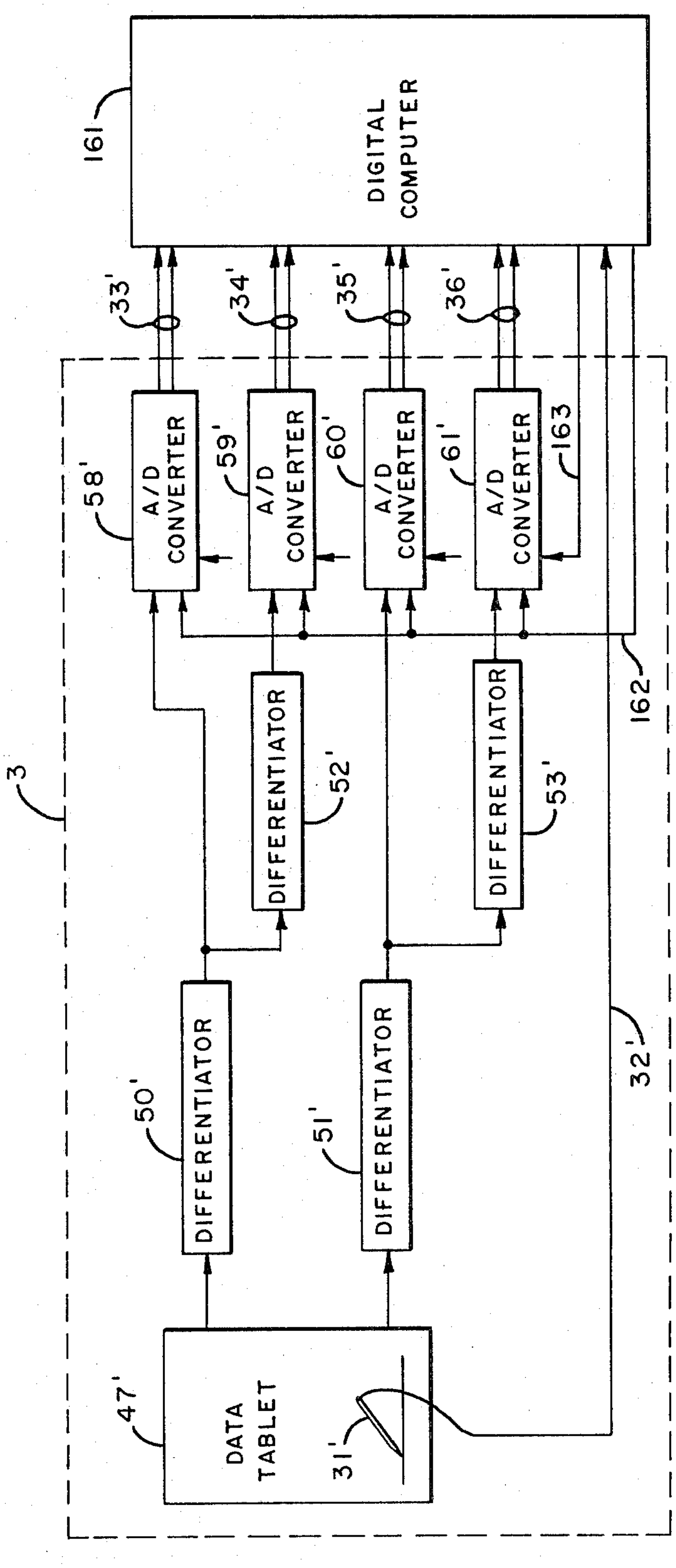
FIG. 9 is an alternate embodiment of a system embodying this invention.

Although this invention has been described in detail as a system having separate interconnected functional blocks and circuits, an alternate embodiment of the invention is illustrated in FIG. 9 and comprises a measurement circuit 3' and a general purpose digital computer 161. Primed reference characters in FIG. 9 refer to similar components in FIG. 3 designated by the same reference characters. The reference data comprising vectors derived from a plurality of true signatures is stored in the memory of computer 161. Signals representing pen point contact intervals $z(t)$ and the sampled dynamic variables $\dot{x}_j$, $\ddot{x}_j$, $\dot{y}_j$ and $\ddot{y}_j$ are applied on lines 32' and 33'–36', respectively, to the analog-to-digital converters 58'–61'. Programs in the computer structure it to perform the functions described above in relation to FIGS. 1–8 for providing a printed output or illuminating a lamp to authenticate a real time signature written on the data tablet 47'.

Address circuit 8 and memory device 7 (FIG. 3) represent an example of an information bank in which predetermined reference data derived from a plurality of prior signatures of a person is recorded, as in the memory cells of a computer. Alternately, reference data from prior signatures may be recorded or stored in an information bank comprising a coded portable member such as a magnetic or punched card, which may be carried with the user in the manner of a credit card. Reader apparatus connected to the system receives such a card, reads the reference data on it, and appropriately conditions the various circuits of the system to prepare them for the real time signature validation process. Such a reader 170 and card 171 are indicated in the broken lines in FIG. 3 and adapt the authentication process for utilization in a self-contained unit located in the field at the site of actual signature validation.

The operation of the system illustrated in FIGS. 3–5 and 7 will now be briefly summarized. Consider that the signature, called the test signature, of an individual claiming to be Gaynell Marguerite Montgomery is to be authenticated. The reference vector corresponding to the true signature for this name is retrieved from memory 7 by entering an associated code, such as a number, into address circuit 8. This causes the values of the element L and S of the reference vector to be applied to the end of signature computer 4. The other elements $m_i$ and $v_i$ of the reference vector are applied to measurement comparator 9. This operation also causes address circuit 8 to produce the control pulse on line 16 which enables circuit 12 to reset the logic circuitry in computers 4, 5 and 6, and indicator device 10.

As the test signature illustrated in FIG. 1 is signed with pen 31 along line 62 (see FIG. 3) data tablet 47 produces on line 32 a binary signal $z(t)$ such as that illustrated in FIG. 2 which indicates whether the pen point is in contact with the writing surface of the tablet. The voltage on line 32 is a binary 1, for example, between the times $t_1$ and $t_2$ when the pen is on the writing surface for forming the letter G. This voltage is a binary 0 between times $t_2$ and $t_3$ when the writer raises the pen from the data tablet before writing the letters *ay*.

The binary signal $z(t)$ on line **32*a* is differentiated by circuit 63 (see FIG. 4) to produce pulses of opposite polarities which indicate the start and stop of an associated contact interval. The negative pulses produced at the even numbered times $t_2, t_4, \ldots t_{26}$ are passed by steering diode 66 and counted by circuit 69. Thus, the binary number in counter 69 is a current indication of the number of contact intervals in the test signature. Circuit 73 senses changes in the contents of counter 69 and produces control pulses on lines 38 indicating this occurrence. Circuit 71 is responsive to each control pulse on line 38 for comparing the binary number in counter 69 with the stored binary number L on line 20, the latter number corresponding to the correct number of contact intervals in the associated true signature. When these binary numbers are equal, comparator circuit 71 produces a control pulse on line 27** indicating the occurrence of the end of the test signature.

The first positive pulse produced by differentiator 63 at time $t_1$ is passed by steering diode 65 and latches gate 67 open for passing sample pulses which are counted by circuit 68. Thus, the contents of counter 68 is a current indication of the time duration of the test signature. Circuit 70 is responsive to timing pulses for comparing the binary number in counter 68 with the stored binary number S on line 21, the latter number S being greater than the actual time duration of, and thus the number of sample pulses produced during, the true signature. Gate circuit 67 is closed by an end of signature control pulse to block subsequent sample pulses from counter 68. If the binary number in circuit 68 exceeds the constant S, comparator 70 produces a control pulse on line 40 that opens gate 143 and illuminates the lamp 146 (see FIG. 7) to indicate that the test signature is incomplete.

Counter 80 of contact interval computer 5 (see FIG. 4) is also enabled by the first positive pulse passed by steering diode 65 at time $t_1$ for counting sample pulses. This circuit is responsive to the end of signature pulse for holding the contents thereof which is equal to the number of sample pulses produced during and is an indication of the time duration of the test signature and is the element $u_1$ of the signature vector.

Gate 76 (see FIG. 4) is enabled during each of the contact intervals such as $I_1$ by binary signal $z(t)$ on line 32*b* for passing sample pulses which are counted by circuit 78. Counter 78 is responsive to the output of sense circuit 73, indicating a change in the contents of counter 69 and the termination of a contact interval, for subsequently dumping the contents of counter 78. Thus, a particular count in counter 78 prior to reset thereof is equal to the number of sample pulses produced during and is an indication of the time duration of a contact interval.

Each of comparators 81*a*–81*e* is responsive to pulses produced by sense circuit 73 for comparing the binary number in counter 69 which identifies the current contact interval with the associated preset binary number designating a particular contact interval. When the binary number on lines 37 designates the first contact interval, only comparator 81*a* produces an output pulse which enables the associated buffer register 83*a* to read and store the count in counter 78 before the latter is reset by the output of sense circuit 73. In a similar manner, comparators 81*b*–81*e* and the associated buffer registers are operative during the contact intervals $I_2$, $I_3$, $I_4$ and $I_5$, respectively, for storing binary numbers which are equal to the number of sample pulses occurring and being measures of the time durations of these contact intervals. Divider circuits 85*a*–85*e* are responsive to timing pulses produced subsequent to the end of signature pulse for dividing the binary number in the associated buffer registers by the binary number in counter 80 (the latter corresponding to the element $u_1$) to produce the elements $u_2 - u_6$, respectively, of the signature vector. These elements are measures of the time durations of the associated contact intervals normalized by the total time duration of the test signature. More specifically, these elements are equal to the number of sample pulses produced during an associated contact interval divided by the number of sample pulses produced during the signing of the test signature.

As the test signature in FIG. 1 is signed, data tablet 47 also produces on lines 48 and 49 (see FIG. 4) signals which are time varying functions of the x and y coordinates of the pen point position. These signals are each differentiated once to produce the analog signals on lines 54 and 55 which are functions of the pen point velocity $x(t)$ and $y(t)$, respectively, and again to produce the analog signals on lines 56 and 57 which are functions of the pen point accelerations $x(t)$ and $y(t)$, respectively. The velocities and accelerations represented by these analog signals on lines 54–57 are a continuous function of time. Converters 58–61 are responsive to each pulse on line 24 for sampling the values of the associated analog input signals. By way of example, the sample pulses may have a pulse repetition frequency of 30 Hz. The converters are also responsive to the clock pulses for converting these sampled analog signals into associated binary signals on lines 33–36 which represent the velocities and accelerations of the pen point in the $x$ and $y$ directions at discrete times.

Multiplier 93*a* and accumulator 95*a* (see FIG. 5) are responsive to timing and clock pulses for squaring each of the sampled values of the velocity $\dot{x}_j$ and accumulating them. Circuit 98a is responsive to a timing pulse produced subsequent to the end of the signature control pulse and to clock pulses for dividing the accumulated signal in accumulator 95*a* by the signal $u_1$ to produce the element $u_7$ of the signature vector which is the self-moment of the sampled velocity $\dot{x}_j$. In a similar manner, the computation circuits 90*b*–90*j* compute other moments of the sampled dynamic variables $\dot{x}_j$, $\ddot{x}_j$, $\dot{y}_j$, and $\ddot{y}_j$.

Subtraction circuits 137 (see FIG. 7) are each responsive to timing and clock pulses for computing the differences between the binary input signals representing the computer values of the signature vector elements $u_i$ and the stored values of the reference vector elements $m_i$. Comparator circuits 138 are responsive to timing pulses for comparing the difference signals $|u_i - m_i|$ on lines 149 with the associated variation values $v_i$ for producing output signals which are a binary 1 for example when an associated difference signal is less than or equal to an associated value $v_i$. The binary 1's on lines 150 indicate which of the elements $u_i$ are considered to have been derived from a true signature. These binary signals are summed by adder 139 and compared in circuit 140 with the preset binary number in circuit 141 that indicates the number of elements $u_i$ that must be considered to have been derived from a true signature for the test signature to also be considered to be a true signature. If the sum signal in adder 139 is greater than or equal to the preset binary number, the output of comparator 140 is a binary 1, for example, that opens gate 142, the latter being enabled by the end of signature pulse, to illuminate lamp 145 to indicate that the test signature is a true signature.

Control circuit 144 is enabled by the end of signature pulse for counting subsequently produced clock pulses. If the binary signal from comparator 140 indicating that the test signature is a true signature is not produced within a preset time interval after generation of the end of signature pulse, the output of control circuit 144 opens gate 143 to illuminate lamp 146 to indicate that the test signature is incomplete and is not considered to be a true signature.

What is claimed is:

1. Apparatus for authenticating a signature comprising
   - transducer means having a writing surface with $x$ and $y$ Cartesian coordinate axes and a stylus engageable with said surface for impressing thereon a real time signature to be authenticated,
   - means for energizing said transducer means,
     - said transducer means having output terminals and being responsive to the engagement of the stylus with said surface for generating at said terminals real time signals corresponding to the number $z(t)$ of contacts of said stylus with said surface and the variations $x(t)$ and $y(t)$ with time of the $x$ and $y$ coordinates of the stylus on said surface during the writing of the signature,
   - means connected to said terminals for deriving signals corresponding to the velocity $\dot{x}(t)$, $\dot{y}(t)$ and acceleration $\ddot{x}(t)$, $\ddot{y}(t)$ components of said stylus during the writing of said signature,
   - means responsive to said component signals and to said stylus contact signals for generating a vector representative of said real time signature,
   - means for storing a corresponding reference signature vector derived from the variables $z(t)$, $\dot{x}(t)$, $\dot{y}(t)$, $\ddot{x}(t)$, and $\ddot{y}(t)$ of a plurality of prior signatures of the same person, and
means for comparing said real time signature vector with said stored reference vector to authenticate said signature.

2. The apparatus according to claim 1 in which said signature vector generating means comprises
means for computing moments of said velocity and acceleration components.

3. The apparatus according to claim 1 in which said signature vector generating means comprises
means for computing cross-moments of said velocity and acceleration components.

4. The apparatus according to claim 1 in which said signature generating means comprises
means for computing self-moments and cross-moments of said velocity and acceleration components.

5. The apparatus according to claim 2 in which said signature vector generating means also comprises
means for determining the duration of the real time signature.

6. The apparatus according to claim 5 in which said signature vector generating means also comprises
means for determining the ratio of time duration of each of a predetermined number of stylus-surface contact intervals to the duration of said real time signature.

7. In a system for authenticating a real time signature, written by a person with a stylus,
means for measuring the rate of movement of said stylus during writing of the signature,
means responsive to the output of said measuring means for computing real time self-moments and cross-moments of stylus movement rates,
means for recording data corresponding to the average of such moments of stylus movement rates derived from a plurality of prior signatures written by a person, and
means for comparing said real time moments with said recorded data and determining the authenticity of said real time signature.

8. The system according to claim 7 in which said measuring means comprises
means for deriving velocity and acceleration components of said stylus movements,
said computing means comprising
a multiplier adapted to multiply said velocity and acceleration components to produce said moments thereof.

9. The system according to claim 8 with means for determining the time interval required for the writing of said real time signature, and
means for dividing the output of said multiplier by the output of said time interval determining means whereby said moments are normalized to signature duration.

10. The system according to claim 7 in which said data recording means comprises a portable coded card, and reader means adapted to read the code on said card and produce a corresponding input to said comparing means.

11. A system for authenticating a test signature comprising
transducer means having a writing surface with Cartesian x and y coordinate axes and a stylus engageable with said surface for impressing thereon a test signature to be authenticated,
means for energizing said transducer means,
said transducer means having output terminals and being responsive to the engagement of the stylus with said surface for generating at said terminals real time signals corresponding to the number $z(t)$ of contacts of said stylus with said surface and the variations $x(t)$ and $y(t)$ with time of the $x$ and $y$ coordinates of the stylus on said surface during the writing of the signature,
means connected to said terminals for deriving signals corresponding to the velocity $\dot{x}(t)$, $\dot{y}(t)$ and acceleration $\ddot{x}(t)$, $\ddot{y}(t)$ components of said stylus during the writing of said signature,
means for converting said velocity and acceleration components to digital form,
means for sequentially multiplying each of said digitized components by the other throughout writing of the signature to produce products corresponding to the moments, respectively, of said components,
means for cumulatively summing the output of said multiplying means,
a clock adapted to produce timing pulses,
a counter responsive to said pulses from said clock and to the duration of the contact of said stylus with said surface during the writing of the signature for generating an output corresponding to the time duration of said signature,
divider means connected to the outputs of said cumulative summing means and of said counter for dividing the former by the latter whereby to normalize said moments to the time duration of the signature,
memory means preconditioned by a plurality of reference signatures of the same person to produce outputs corresponding to recorded mean values of the normalized moments of said plurality of signatures and to recorded variances greater than the average variations, respectively, between the mean and actual values of each of said normalized moments for said plurality of signatures,
subtractor means responsive to the outputs of said divider means and said memory means for producing an output representative of the differences between real time and recorded values of said moments, respectively,
comparator means responsive to the outputs of said subtractor means and to the variances in said memory means for determining the number of said differences that exceed said variances, and
indicator means responsive to the output of said comparator means for indicating the validity of said real time signature.

12. The system according to claim 11 which includes adder means responsive to the several outputs of said comparator means for summing said numbers and means for comparing the output of said adder means with a preset threshold value to condition said indicator means.

13. The system according to claim 12 with an AND gate connected to the output of said last named comparator means, means for comparing the numbers $z(t)$ of said contacts in said test signature and in a reference signature and producing an output when the former equals the latter, and means responsive to the output of said last named means for enabling said gate.

14. In automatic apparatus, the method of determining whether a newly written signature and a previously recorded signature were made by the same person consisting of the steps of measuring movements of the writing instrument during writing of the signature and deriving therefrom velocity and acceleration of the instrument, calculating self-moments and cross-moments of said velocity and acceleration characteristics, comparing said moments with corresponding moments derived from the previously recorded signature, and generating a signature validation decision based on the degree with which said compared moments match.

15. The method according to claim 14 including the steps of measuring the durations of instrument-writing surface contact intervals and the total signature interval, dividing the durations of a plurality of said contact intervals by the duration of said total signature interval to normalize the former, comparing said normalized contact intervals with corresponding normalized intervals derived from said previously recorded signature, and additionally conditioning said signature validation decision on the degree with which said compared normalized intervals match.

16. The method according to claim 15 including the steps of counting the number of instrument-writing surface contacts in the newly written signature, comparing said number of contacts with a constant equal to the number of said contacts in said previously recorded signature and, further conditioning said signature validation decision on the equality of said constant and said number of contacts in the newly written signature.

17. The method of determining whether a test signature and a plurality of previously written reference signatures were made by the same person consisting of the steps of continuously measuring movements of the pen relative to the writing surface during writing of the test signature and deriving measurements with respect to time of pen-writing surface contacts $z(t)$ and orthogonal coordinates $x(t)$ and $y(t)$ of the pen point, timing the duration $u_1$ of the entire test signature, timing the durations $u_2$ of a plurality of pen-surface contact intervals with respect to the signature duration $u_1$, differentiating orthogonal pen movements $x(t)$ and $y(t)$ and deriving analog velocity $\dot{x}(t)$, $\dot{y}(t)$ and acceleration $\ddot{x}(t)$, $\ddot{y}(t)$ variables thereof, converting said analog velocity and acceleration variables to digital form, multiplying the digitized velocity and acceleration variables by each other and deriving a plurality of moments $u_7$ therefrom, calculating the mean values $m_1$, $m_2$ and $m_7$ or corresponding variables $u_1$, $u_2$ and $u_7$, respectively, of said plurality of reference signatures, subtracting the values of said test signature characteristics $u_1$, $u_2$ and $u_7$ from said mean values $m_1$, $m_2$ and $m_7$, respectively, and comparing the differences with respective predetermined variance limits to establish the number of said test signature characteristics which match said mean values, respectively, and indicating signature validation when said number of matches exceed a preset threshold.

18. The method according to claim 17 with the steps of counting the number of pen-surface contacts occurring during writing of the test signature, comparing said number of contacts with a constant equaling the number of such contacts in said reference signatures, conditioning the generation of said validation decision on the requirement that said test signature contacts equal said constant.

19. The method according to claim 18 including the steps of comparing the time duration of the test signature with a constant having a value exceeding the time duration of said reference signature by a predetermined margin, and indicating invalidation of the test signature if the time duration thereof exceeds said last named constant.

* * * * *

UNITED STATES PATENT OFFICE
CERTIFICATE OF CORRECTION

Patent No. 3,699,517 Dated October 17, 1972

Inventor(s) James W. Dyche

It is certified that error appears in the above-identified patent and that said Letters Patent are hereby corrected as shown below:

Column 4, line 14, change "dynamic variables x, x, y and y" to --dynamic variables $\dot{x}$, $\ddot{x}$, $\dot{y}$ and $\ddot{y}$--.

Column 4, line 27, change "samples dynamic variables x, x, y and y" to --sampled dynamic variables $\dot{x}$, $\ddot{x}$, $\dot{y}$ and $\ddot{y}$--.

Column 7, line 36, change "83a-83" to --83a-83e--.

Column 13, line 39, after "respectively," insert --to computer 161. Sample pulses and clock pulses are produced by the computer and are applied on lines 162 and 163, respectively,--.

Column 15, line 48, change "x(t) and y(t)" to --$\dot{x}(t)$ and $\dot{y}(t)$--.

Column 15, line 50, change "x(t) and y(t)" to --$\ddot{x}(t)$ and $\ddot{y}(t)$--.

Signed and sealed this 10th day of April 1973.

(SEAL)
Attest:

EDWARD M.FLETCHER,JR.
Attesting Officer

ROBERT GOTTSCHALK
Commissioner of Patents